United States Patent
Coughlan et al.

(10) Patent No.: US 7,729,478 B1
(45) Date of Patent: Jun. 1, 2010

(54) CHANGE SPEED OF VOICEMAIL PLAYBACK DEPENDING ON CONTEXT

(75) Inventors: Marc William Joseph Coughlan, Rozelle (AU); Alexander Quentin Forbes, Westleigh (AU); Peter D. Runcie, Bilgola Plateau (AU); Alexander Martin Scholte, Phegans Bay (AU); Ralph Warta, Lane Cove (AU)

(73) Assignee: Avaya Inc., Basking Ridge, NJ (US)

( * ) Notice: Subject to any disclaimer, the term of this patent is extended or adjusted under 35 U.S.C. 154(b) by 919 days.

(21) Appl. No.: 11/105,134

(22) Filed: Apr. 12, 2005

(51) Int. Cl.
*H04M 1/64* (2006.01)

(52) U.S. Cl. ............... 379/88.04; 379/88.14; 379/88.25

(58) Field of Classification Search ............. 379/88.14, 379/88.01–88.04, 88.25; 704/231
See application file for complete search history.

(56) References Cited

U.S. PATENT DOCUMENTS

| | | | |
|---|---|---|---|
| 5,206,903 A | 4/1993 | Kohler et al. | |
| 5,504,805 A * | 4/1996 | Lee | 379/88.03 |
| 5,555,343 A * | 9/1996 | Luther | 704/260 |
| 5,687,220 A | 11/1997 | Finnigan | |
| 5,828,747 A | 10/1998 | Fisher et al. | |
| 5,905,793 A | 5/1999 | Flockhart et al. | |
| 5,982,873 A | 11/1999 | Flockhart et al. | |
| 6,006,185 A * | 12/1999 | Immarco | 704/251 |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,396,908 B1 | 5/2002 | O'Donovan et al. | |
| 6,446,041 B1 * | 9/2002 | Reynar et al. | 704/260 |
| 6,459,776 B1 * | 10/2002 | Aktas et al. | 379/88.13 |
| 6,804,645 B1 * | 10/2004 | Kleinschmidt | 704/243 |
| 7,092,496 B1 * | 8/2006 | Maes et al. | 379/88.01 |
| 7,203,285 B2 * | 4/2007 | Blair | 379/32.01 |
| 7,228,276 B2 * | 6/2007 | Omote et al. | 704/243 |
| 7,433,818 B2 * | 10/2008 | Caldwell et al. | 704/235 |
| 7,480,613 B2 * | 1/2009 | Kellner | 704/231 |
| 2005/0129188 A1 * | 6/2005 | Lee et al. | 379/88.01 |

OTHER PUBLICATIONS

T-Mobile Press Release entitled, "New performance features for the Mobilbox are now available to all customers," (Apr. 30, 2002), 2 pages.
Visual IT Mobile Solutions website entitled "Simple SMS," (updated Jan. 24, 2005), available at http://www.visualit.co.uk.simplesms.htm, 2 pages.

(Continued)

*Primary Examiner*—Simon Sing
(74) *Attorney, Agent, or Firm*—Sheridan Ross P.C.

(57) ABSTRACT

A messaging system is provided that includes:
(a) an interface 206 for receiving a request to play a message audibly to a subscriber; and
(b) a message retrieval agent 224 for determining whether the message comprises marked information. When the message comprises marked information, the agent 224 performs one or more of the following operations:
(b1) display the marked information to the subscriber;
(b2) alter an audio playback speed of the marked information to the subscriber, the playback speed of the marked information being different from a playback speed of unmarked information; and
(b3) audibly play only one of the marked information and unmarked information to the subscriber.

29 Claims, 5 Drawing Sheets

OTHER PUBLICATIONS

University of Saint Francis website entitled, "Campus Computing Residential Network Info—Student Voicemail Information," (printed Feb. 9, 2005), available at http://www.sf.edu/computing/voicemail.shtml, 3 pages.

"Schusterman Center Octel Voicemail Tips," (printed Feb. 9, 2005), available at http://tulsa.ou.edu/voice/Octel_Tips.htm, 2 pages.

Callback4u.com website entitled, "Wish You Could Use Callback, But Your Local Service Is Blocking It?" (printed Feb. 9, 2005), available at http://www.callback4u.com/callback/trigger-by-email-sms.htm, 2 pages.

"SMS Callback," (printed Feb. 9, 2005), available at http://www.voipswitch.com/SMScallback.htm, 6 pages.

Phone Warehouse website entitled, "Phone Facts—The Answering Machine," (2000), available at http://www.affordablephones.net/answeringmachine.htm, 7 pages.

TWAcomm.com website entitled, "AT&T Digital Answering System Phone," (1997-2005), available at http://www.twacomm.com/Catalog/Model_1818.htm, 2 pages.

"Mediaplace.nl—Nokia Phone Forums—Nokia 6100 Cellular Phone Pictures and Specifications" (posting of Dec. 12, 2004) printed (Jun. 27, 2008) http://web.archiveorg/web/20041209102257/www.mediaplace.nl/nokia-6100-cellar-phon.html (4 pages).

"Products Overview: Recognition SDK", Visiphor Corporation Website, available at http://www.visiphor.com/product/, as early as Jan. 16, 2005, pp. 1-2, printed on Jan. 9, 2009.

"Motion Image Separation Technology", Mist Motion Image Separation Technology Website, available at http://web.archive.org/web/20040826101158/http://www.ar-t.co.uk/mist_data.html, as early as Aug. 24, 2004, pp. 1-1, printed on Jan. 9, 2009.

"Products", NeualWare website, available at http://www.neuralware.com/products.jsp, as early as Jan. 16, 2005, pp. 1-6, printed on Jan. 9, 2009.

"The Pattern Recognition Files", Software and Hardware for Data Analysis, Pattern Recognition and Image Processing, available at http://www.ph.tn.tudelft.nl/PRInfo/software.html, as early as Jan. 24, 2004, pp. 1-5, printed on Jan. 9, 2009.

Cula, et al., "Recognition Methods for 3D Textured Surfaces", Proceedings of SPIE Conference on Human Vision and Electronic Imaging VI, San Jose, available at http://www.ece.rutgers.edu/~kdana/research/spie01.pdf, Jan. 2001, pp. 1-14, printed on Jan. 9, 2009.

Background for the above captioned application (previously provided).

* cited by examiner

CHANGE SPEED OF VOICEMAIL PLAYBACK DEPENDING ON CONTEXT

FIELD

The invention relates generally to telecommunication systems and particularly to messaging systems.

BACKGROUND

Voice messaging systems are in widespread use in businesses of every size around the world. A typical voice messaging system includes a database or other data repository for voice mail messages and a voice messaging server, such as Avaya Inc.'s Aria™, Serenade™, and Intuity Audix™ products. The voice messaging server controls storage and retrieval of voice messages to/from the data repository.

With the advent of text messaging, traditional voice messaging systems are being replaced by unified messaging systems. Such systems have the ability to create and respond to multimedia messages with fidelity to the originator from either a telephone or Personal Computer (PC)/laptop. Personal call control further permits realtime control of incoming calls and call rebound with message processing. Examples of unified messaging systems are Avaya Inc.'s Unified Messenger™ and Modular Messaging™ products. Unified messaging systems commonly reside in a server that attaches to a Private Branch Exchange (PBX) and converses across a Local Area Network (LAN) with other messaging servers and clients.

A recurring problem in voice and unified messaging systems is having to play a voice message repeatedly to record important message information, such as names, street addresses, telephone numbers, email addresses, and the like. Some messaging systems permit a user to manually slow or accelerate the replay speed of a voice message by pressing an actuator or manipulating an icon in a graphical user interface. Such systems, however, can be frustrating to use as a user may not be able to reduce the speed until a portion of the important message information is already played, thereby requiring him or her to replay the message again and fast forward to the missed information.

SUMMARY

These and other needs are addressed by the various embodiments and configurations of the present invention. The present invention is generally directed to a messaging system that provides selected information to a subscriber in a convenient format.

In a first embodiment, a message retrieval method is provided that includes the steps:

(a) receiving a request to play a message audibly to a subscriber;

(b) determining whether the message comprises marked and unmarked information; and (c) when the message comprises marked and unmarked information, providing the marked information to the subscriber in a manner different from that used to provide the unmarked information. Examples of providing the marked and unmarked information differently include (i) displaying selectively the marked information to the subscriber in a manner different from that of unmarked information in the message; (ii) altering an audio playback speed of the marked information to the subscriber (the playback speed of the marked information being different from a playback speed of unmarked information); and/or (iii) audibly playing only one of the marked information and unmarked information to the subscriber.

Marking of the information of interest to the subscriber (or important information) in a message can be done through voice recognition software together with an expert system that detects and tags the important information. Important information can include a first and/or last name, a street address, a telephone number, an email addresses, a Uniform Resource Locator (URLs), price, order number, article name, and any other valuable information.

In example (i) above, the marked information is preferably displayed either alone or together with unmarked information but in a different font or otherwise highlighted to the subscriber relative to the unmarked information. This may be done before, during, and/or after message playback. The display can be made on the subscriber's telephone display, a computer or laptop monitor, and the like.

In example (ii) above, the marked information is preferably played at a slower speed than the unmarked information to provide the subscriber with time to record the marked information. For example, normal (unmarked) information (e.g., "hello this is John") can be automatically played at normal speed while marked information can be played at slower-than-normal speed. In other words, the speed of the playback depends on the context of the message being played. Because the voice message being played is typically different from the text equivalent of the message containing the marked and unmarked information, synchronizing marker identification in the parsed text output with the adjustment of voice message playback speed can be important to assure that playback is slowed only for the correct information.

In example (iii) above, the entire message is generally not played. For example, during or after playback of the message the subscriber can press a key to cause the telephone number provided in the message to be selectively replayed to the subscriber.

The present invention can provide enhanced subscriber convenience and time savings because the subscriber no longer needs to replay the entire message to obtain selected or important information. The information is provided to the subscriber differently from less important information so that the subscriber may record the information easily. The subscriber is no longer frustrated by not being able to reduce manually the playback speed before a portion of the important message information is already played, thereby requiring him or her to replay the message again and fast forward to the missed information.

These and other advantages will be apparent from the disclosure of the invention(s) contained herein.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
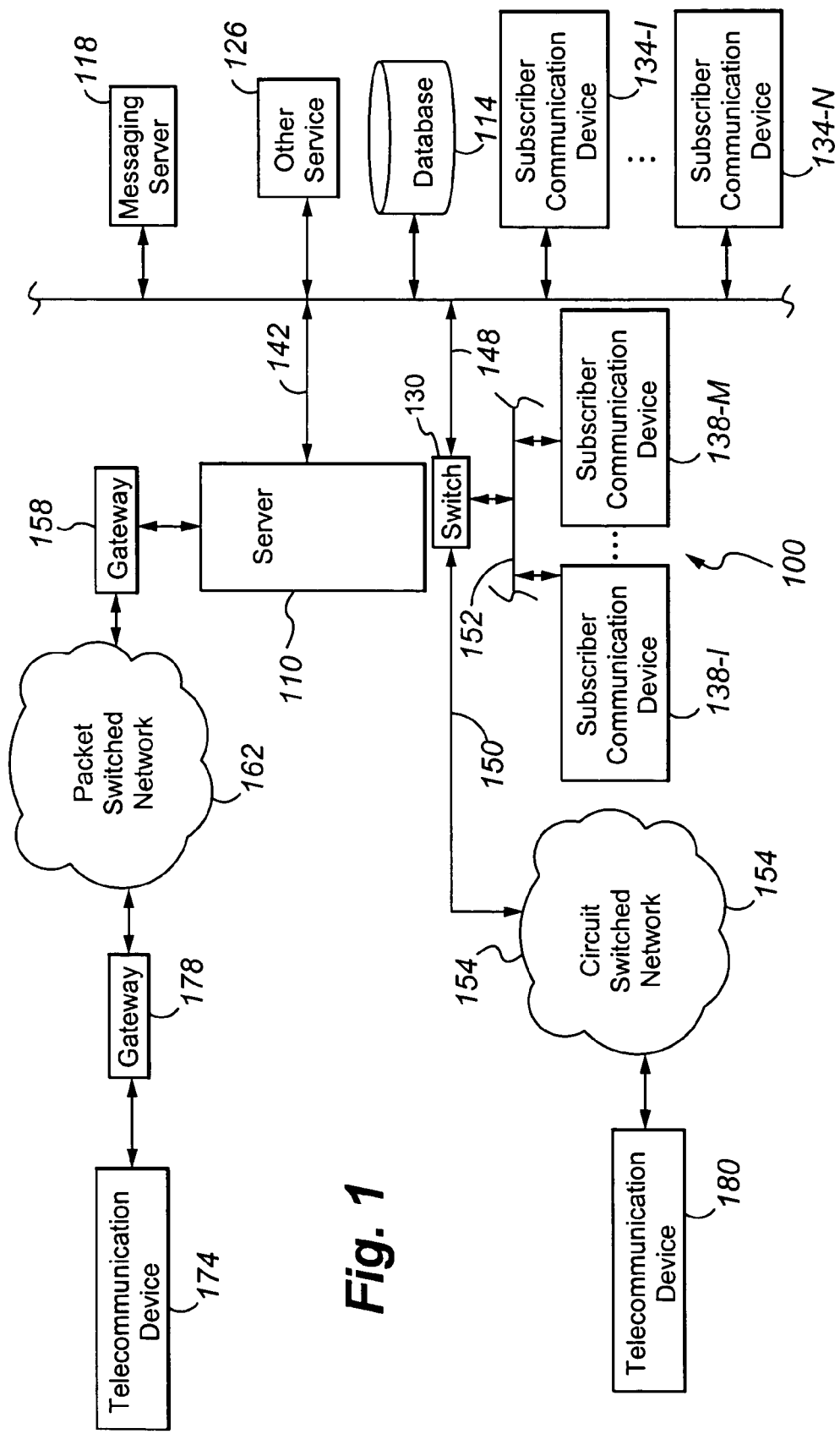
FIG. 1 is a block diagram of a telecommunications system according to an embodiment of the present invention.

FIG. 1 shows an illustrative embodiment of the present invention. An enterprise network 100 comprises a central server 110, a set of data stores or databases 114 containing subscriber information, text and voice messages, and other enterprise-related information, and a plurality of servers, namely a messaging server 118, and other servers 126, a switch 130, a plurality of subscribers (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 148 to the switch 130. As will be appreciated, the other servers 126 can also include a scanner (which is normally not connected to the switch 130 or Web server), VoIP software, video contact software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The server 110 and switch 130 can be any converged architecture for directing circuit-switched and/or packet-switched customer contacts to one or more communication devices. In a preferred configuration, the functionalities of the server 110 and switch 130 are integrated into a common hardware component. Typically, the component is a stored-program-controlled system that conventionally includes interfaces to external communication links, a communications switching fabric, service circuits (e.g., tone detectors and generators, etc.), memory for storing control programs and data, and a processor (i.e., a computer) for executing the stored control programs to control the interfaces and the fabric and to provide automatic contact-distribution functionality. Features provided by the component typically include not only telephony features and intelligent contact routing but also localization, collaboration, mobility, messaging, system management, attendant features, networking, and application programming interfaces. The server typically includes a network interface card (not shown) to provide services to the serviced telecommunication devices.

Illustratively, the component can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Avaya Inc.'s IP600™ LAN-based ACD system, or an S8100™, S8300™, S8500™, S8700™, or S8710™ media server running Avaya Inc.'s Communication Manager™ voice-application software with call processing capabilities and contact center functions. Other types of known switches and servers are well known in the art and therefore not described in detail herein.

The gateway 158 is an electronic signal repeater and protocol converter that provides a telephone exchange service, supporting the connection of various types of telephones (such as Digital Control Processor or DCP phones, analog phones, and IP telephones) and outside packet-switched and/or circuit-switched telephone lines (such as analog trunks, ISDN lines, E1/T1 voice trunks, and WAN routing IP trunks). Telephone lines are connected to the gateway via ports and media modules on the chassis, with different media modules providing access ports for different types of telephones and lines. Voice and signaling data between packet-switched and circuit-switched protocols is effected by the media modules converting the voice path to a TDM bus inside the gateway. An engine, such as a Voice Over IP or VoIP engine, converts the voice path from the TDM bus to a compressed or uncompressed and packetized VoIP, typically on an Ethernet connection. Each gateway commonly includes a number of port and trunk circuit packs for performing selected telecommunications functions, such as (DTMF) tone detection, tone generation, playing audio (music and/or voice) announcements, traffic shaping, and call admission control, a media processor, and one or more IP server interfaces. The gateway may perform policy-based routing, which uses a policy list structure to implement a routing scheme based on traffic source, destination, type, and other characteristics. Common applications include separate routing for voice and data traffic, routing traffic originating from different sets of users through different Internet connections (or Internet Service Providers or ISP's), and defining backup routes for defined classes of traffic. Examples of suitable gateways include Avaya Inc.'s SCC1™, MCC1™, CMC™, G350™ G600™ G650™ and G700™

The first telecommunication devices 134-1, . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport medium.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

Figure 2:
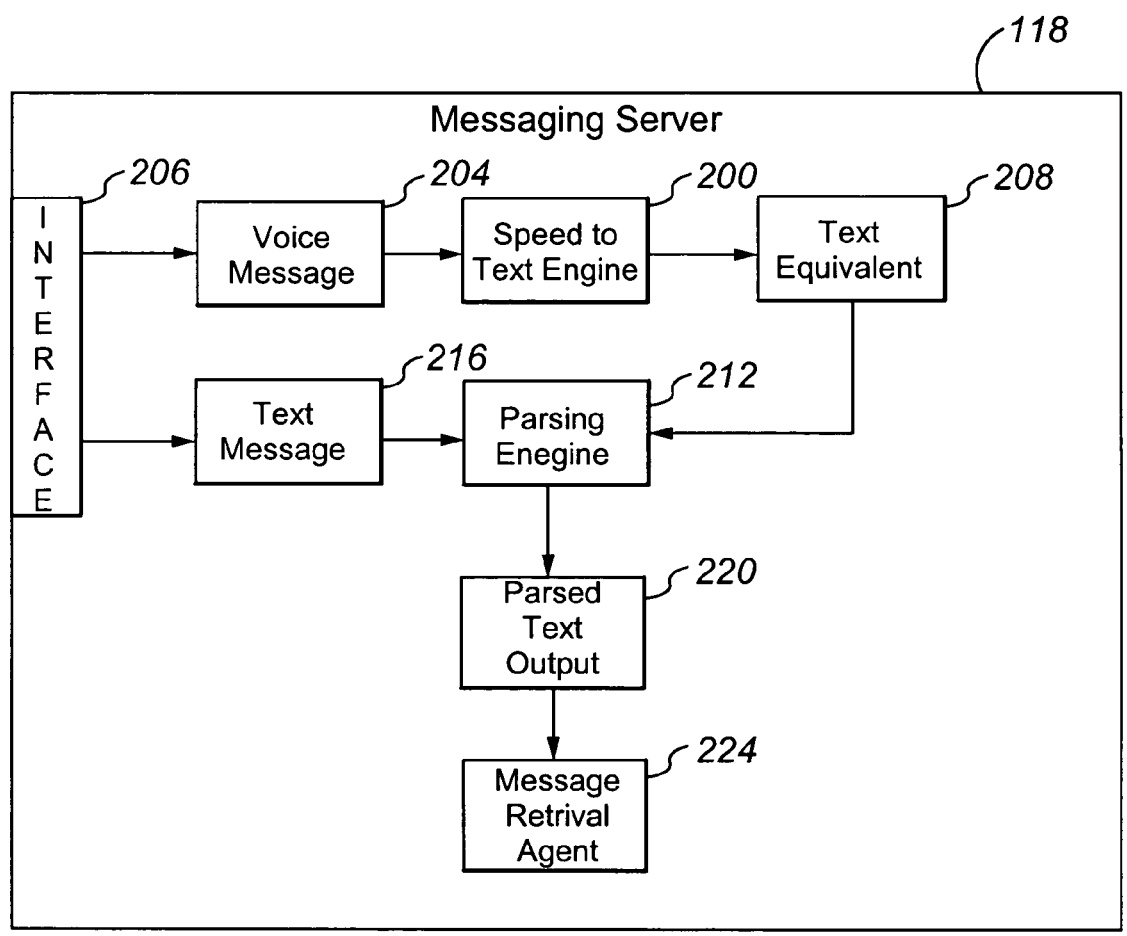
FIG. 2 is a block diagram of a messaging server according to an embodiment of the present invention.

Referring to FIG. 2, one possible configuration of the messaging server 118 is depicted. The server 118 in this implementation includes a processor (not shown), a memory (not shown), one or more interfaces 206 to other devices such as switch 130, server 110, and communication devices 134 and 138, an operating system, and messaging server software modules to perform various messaging functions, such as message storage and retrieval. The processor may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

Included within the memory are a number of software modules providing the functionality of the present invention. The modules include a speech-to-text engine 200 for converting a voice message 204 into a text equivalent 208, a parsing engine for parsing and tagging text messages 216 (such as email messages, instant messages, chat messages, SMS or MMS messages, and the like) and text equivalents 208 into parsed (and tagged/flagged) text output 220, a message interface 206 for communicating with other components to receive and provide voice and text messages 204, 216, and a message retrieval agent 224 for configuring message retrieval activities based on the presence of tags/flags and optionally the types of tags/flags present in the parsed text output 220.

The parsing engine 220 divides the message text into components for analysis according to a set of parsing or grammar rules. As will be appreciated, parsing is divided into lexical analysis and semantic parsing. Lexical analysis divides strings into components, called tokens, based on punctuation and other keys. Semantic parsing uses grammar rules to define the meaning of the string once it's been broken down into individual components.

The grammar rules vary depending on the type of message information to be tagged and provided selectively to the subscriber. For example, street addresses, telephone numbers, email addresses, Uniform Resource Locators (URLs), price, order number, article name, and other valuable information have specific, unique patterns that may be described readily by grammar rules. Street addresses typically are a combination of numbers and letters and can include identifiable combinations of letters, such as state and city names. Telephone numbers typically are a combination of seven (538-2222), ten (303-538-2222), and eleven (1-303-538-2222) digits for national calls and the sequence, international code (optional), country code, area code, and local telephone number, for international calls. UUCP or domain-based email addresses typically are a combination of a handle, the word "at" or symbol "@" followed by the domain name (e.g., HARRYSMITH@MCIMAIL.COM). URLs is a string expression following the standard convention "method:// host_spec {port} {path} {file} {misc}. An example URL is http://www.harrysmith.com". Names, though not following specific patterns, can include common first names (e.g., "Bill", "Mary", etc.) and/or last names (e.g., "Jones", "Smith", etc.) that may be identified by the parser as name indicators.

The flags (a specific bit pattern that indicates that a condition has been met) or tags (code that is inserted into a file, string, or data structure indicating how something is to be interpreted) may indicate the mere presence of important information to the subscriber or the presence and type of important information in the parsed text output. For example, a first type of flag or tag can indicate the presence of a name, a second type of flag or tag the presence of an address, a third type of flag or tag a telephone number (or even different types of telephone numbers (local or long distance national numbers or international number), a fourth type of flag or tag an email address, a fifth type of flag or tag a URL, and the like. The different types of flag or tags are, of course, different sequences of bits. This configuration permits the server 110 to request the subscriber, during message retrieval, whether or not a contact (such as a call) or set up by the server/switch should be initiated with the flagged/tagged electronic address. This would not require the subscriber to key in or otherwise input the electronic address.

During message retrieval, the message retrieval agent 224 identifies the flagged/tagged information and alters message retrieval depending on subscriber preferences. For example, the agent 224, during audio playback, can, during playback of the entire message string, play the information at a slower speed than other (unflagged/untagged) information (which is played at a normal or faster-than-normal speed), playback only the flagged/tagged information to the subscriber, display the flagged/tagged information on the subscriber's graphical user display (GUI) in a font that is different than the remaining text of the message, display selectively the flagged/tagged information on the subscriber's GUI (without any of the unflagged/untagged information being displayed to the subscriber), or any combination of the foregoing options.

Figure 3:
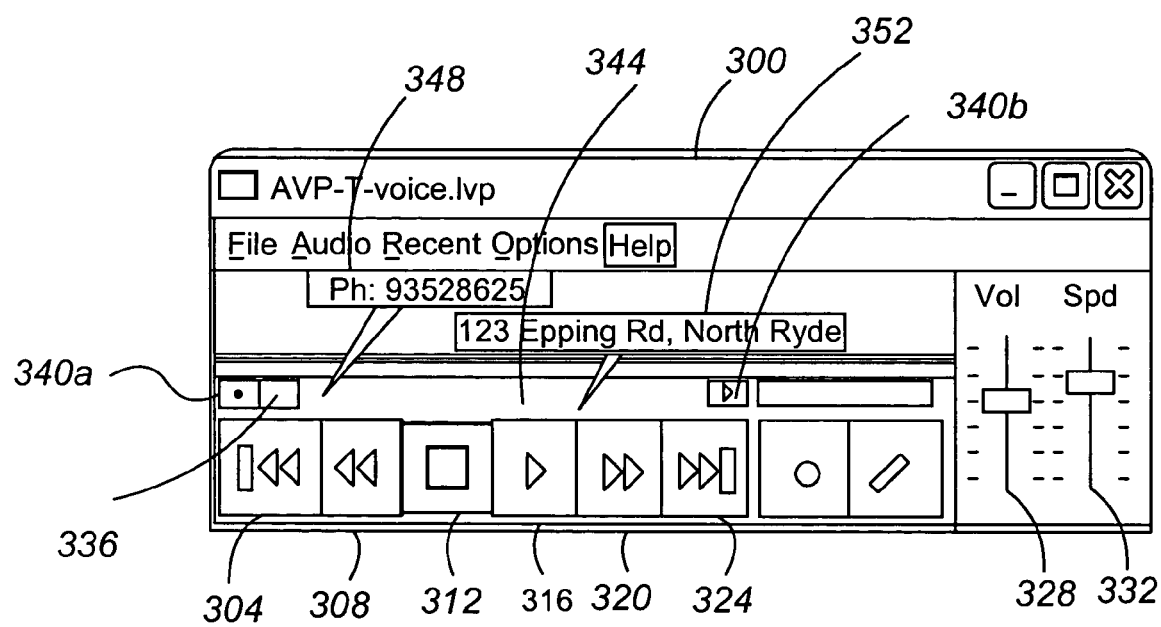
FIG. 3 is a view of an icon for use in a graphical user display according to an embodiment of the present invention.

FIG. 3 is a view of a display 300 on the subscriber's GUI for controlling voice message audio playback. The GUI appears on the subscriber's PC or laptop. The voice message is played back through the speakers of the subscriber's PC or laptop. GUI control of voice message retrieval is performed on products such as Avaya Inc.'s Intuity Audix™ and Modular Messaging™ products. The GUI includes a series of actuators at the bottom of the display, including fast reverse 304, normal reverse 308, stop 312, play 316, normal forward 320, and fast forward 324; controls for volume 328 and (normal) playback speed 332; and a position bar 336 that moves back-and-forth in the window 344 between the message beginning and ending markers 340*a,b* to show the subscriber's current playback position in the message text. As can be seen in FIG. 3, two bubbles 348 and 352 contain flagged/tagged information and have pointers to the window 344 showing the relative location of the information in the message string whose length is represented by the length of the window 344. This information is displayed on the GUI before, during, or after audio message playback.

Figure 4:
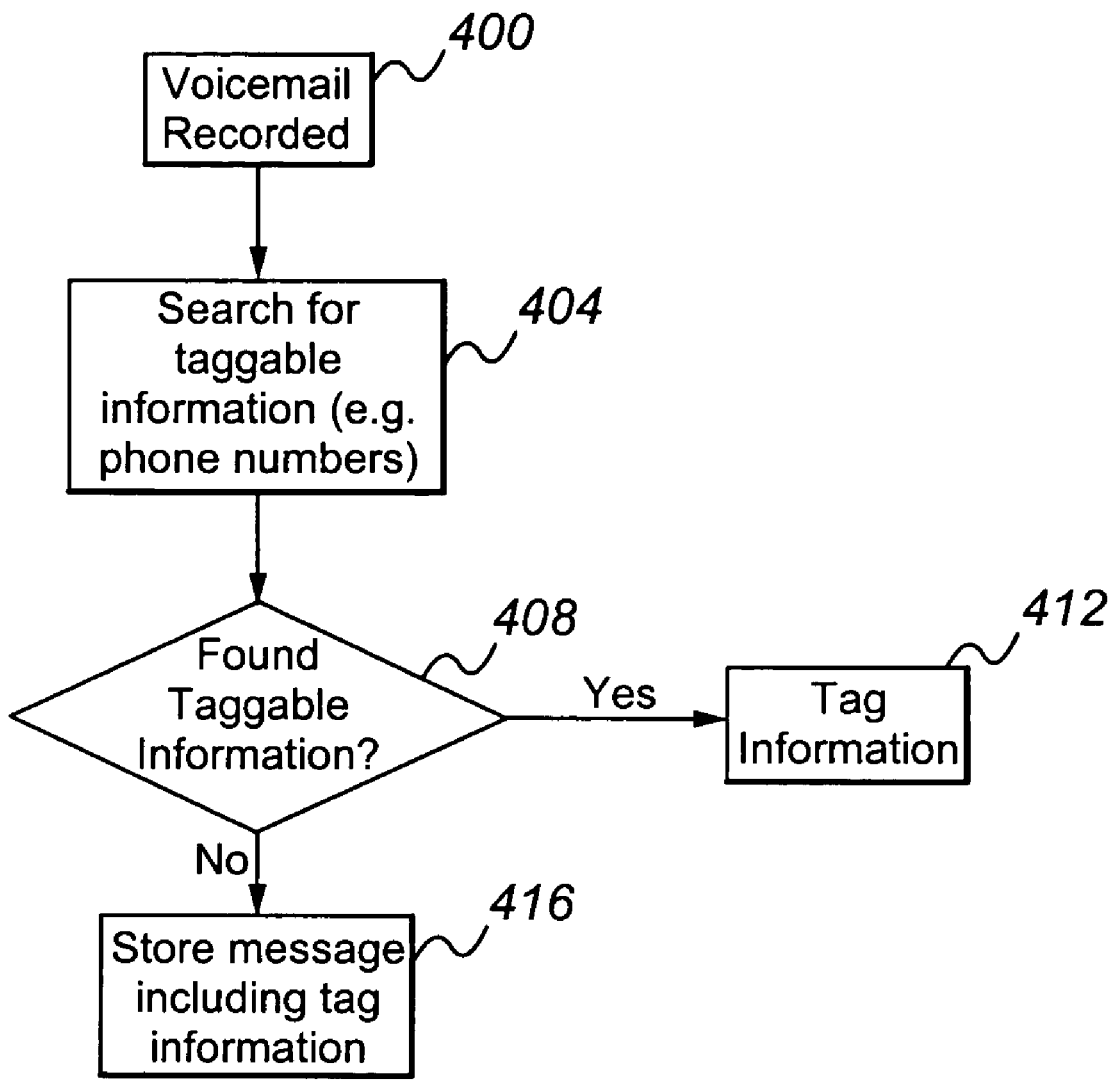
FIG. 4 is a flowchart of the operation of a parsing engine according to an embodiment of the present invention.

The operation of the parsing engine 212 will now be described with reference to FIG. 4.

In step 400, a subscriber records a voice message 204, and the speech-to-text engine 200 creates a text equivalent 208 of the message. The text equivalent may be stored in lieu of or in addition to the voice message.

In step 404, the parsing engine 212 receives and parses the text equivalent 208 to search for, identify, and flag/tag (collectively referred to as "mark") important information. During parsing, the parsed engine 212 determines in decision diamond 408 whether markable information has been found. If so, the information is marked in step 412. If not, the engine proceeds to step 416. If information is located during parsing, the parsed text output 220 includes not only the text equivalent of the voiced words but also the marks identifying markable information. If no information is located during parsing, the parsed text output 220 includes only the text equivalent of the voiced words.

In step 416, the parsed text output 220 is stored and linked with the voice message recording. Alternatively, the parsed text output 220 is stored only when it contains marked information. If no marked information is present, a flag may be stored instead at the linked location indicating the absence of marked information.

Figure 5:
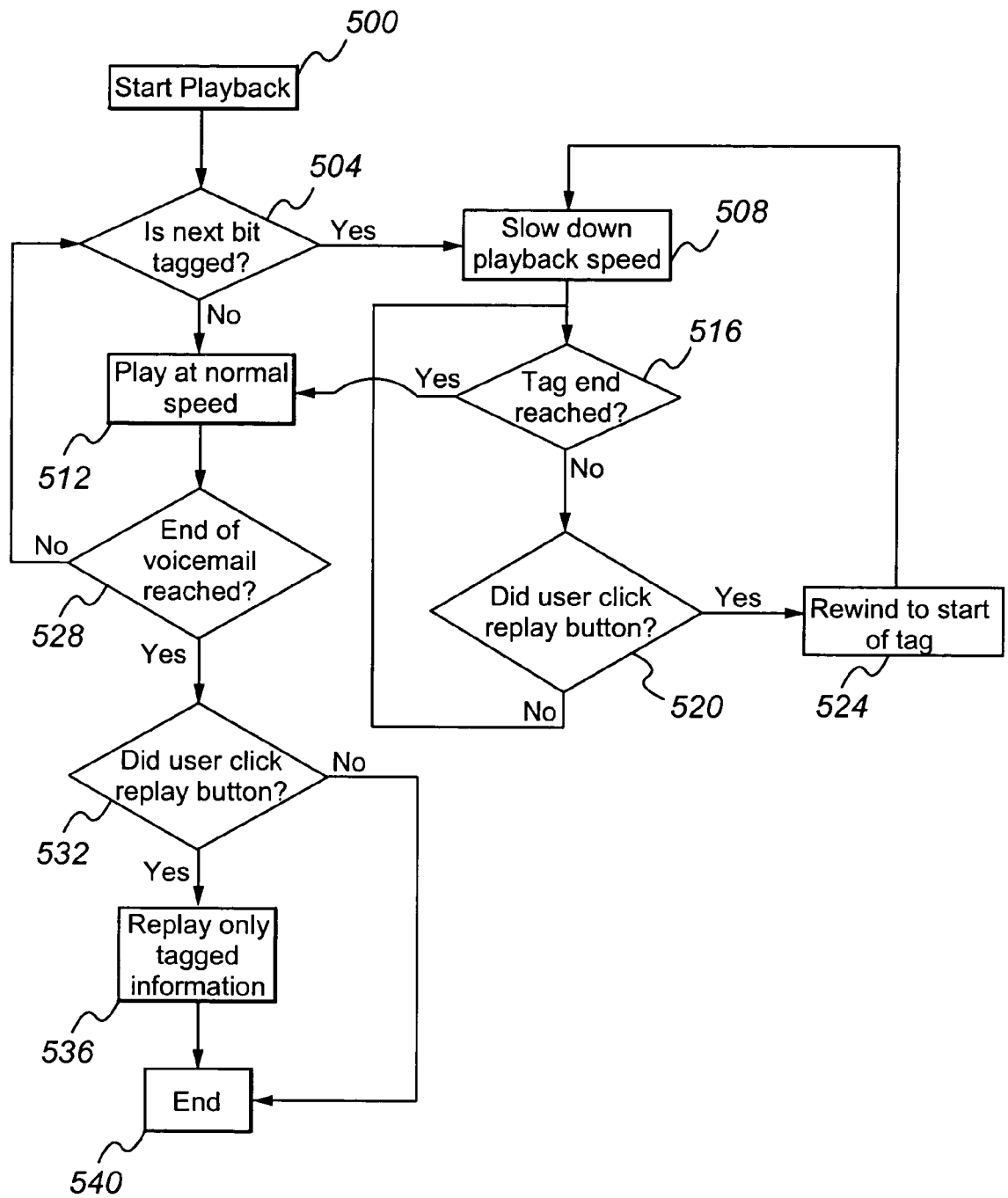
FIG. 5 is a flowchart of the operation of the message retrieval agent according to an embodiment of the present invention.

The operation of the message retrieval agent 224 will now be described with reference to FIG. 5.

In step 500, the agent 224, in response to a subscriber command, starts audio playback of a text message 216 (through a text-to-speech engine) or voice message 204 to the subscriber through the subscriber's communication device 134 or 138.

In decision diamond 504, the agent 224 determines whether or not the parsed text output includes marked information. This decision diamond is performed synchronously with playback of the corresponding text or voice message. Alternatively, the parsed text output 220 itself may be used with a text-to-speech engine (not shown) for audio playback.

When the parsed text output corresponding to the message being played back to the subscriber does not include marked information, the agent 224 proceeds to step 512 and plays the message back to the subscriber at normal speed.

When the parsed text output corresponding to the message being played back to the subscriber includes marked information, the agent 224 proceeds to step 508 and slows down the playback speed and proceeds to decision diamond 516. In decision diamond 516, the agent 224 determines whether the end marker delineating the marked information has been reached. If so, the agent 224 proceeds to step 512. If not, the agent 224 proceeds to decision diamond 520 in which the agent 224 determines whether or not the subscriber clicked the replay button. When the replay button is clicked, the agent 224, in step 524, rewinds to the beginning marker and returns to step 508. When the replay button is not clicked, the agent 224 returns to repeats decision diamond 516.

After step 512, the agent 224 proceeds to decision diamond 528. In this decision diamond, the agent 224 determines whether or not the end of the message being played back has been reached. If not, the agent 224 returns to and repeats decision diamond 504. If so, the agent proceeds to decision diamond 532.

In decision diamond 532, the agent determines whether or not the subscriber has clicked the button to replay only the marked information. If not, the agent proceeds to step 540 and terminates the playback operation. If so, the agent proceeds to step 536 and plays back (and/or displays) only the marked information (and not the unmarked information).

A number of variations and modifications of the invention can be used. It would be possible to provide for some features of the invention without providing others.

For example in one alternative embodiment, the messaging server can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

In another alternative embodiment, the parsing engine and/or message retrieval agent can be placed in different components. For example, either the engine or agent can be in a communication device 134 or 138, the switch 130, or the server 110. Their functions may be distributed among at least one of a communication device 134 or 138, the switch 130, the server 110, and the messaging server 118.

In yet another embodiment, the speech-to-text engine, during word recognition, marks first and/or last names for use by the parsing engine. As will be appreciated, most first names and many last names are in common use. This may be reflected in the word dictionary of the speech-to-text engine.

In yet another embodiment, unimportant information can be marked while important information is unmarked. In other words, unimportant information is delineated by beginning and end markers but important information is not. In this configuration, the playback speed of the marked information can be accelerated relative to the playback speed of the unmarked information. Additionally, the unmarked information is treated as the marked information and vice versa in the above-embodiments.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) receiving, by a message interface, a request to play a spoken message audibly to a subscriber;
   (b) receiving the message, the message being in the form of an audio stream;
   (c) thereafter identifying, by a speech recognition module, selected spoken words in the message, the speech recognition module identifying selected spoken words using a set of grammar rules, the set of grammar rules describing a unique structure of each of a plurality of a street address, a telephone number, an email address, a uniform resource locator, a price, an order number, and an article name;
   (d) embedding, by an expert system, into the audio stream or a text stream derived therefrom, in proximity to the identified selected spoken words, markers;
   (e) providing, by a message retrieval agent, the identified selected spoken words to the subscriber in a manner different from a manner used to provide unselected spoken words to the subscriber; and
   (f) distinguishing, in a display to the subscriber, between selected and unselected words with a relative position of the selected words in a message string being indicated.

2. The method of claim 1, wherein the markers indicate a presence of at least one of (a) important and/or unimportant information and (b) a type of information and wherein step (e) comprises at least one of the following substeps:
   (e1) altering an audio playback speed of the marked selected word to the subscriber, the playback speed of the marked selected word being different from a playback speed of unselected word; and
   (e2) audibly playing only one of the selected word and unselected word to the subscriber.

3. The method of claim 1, wherein the grammar rules describe a unique structure of a street address, a telephone number, an email address, and a Uniform Resource Locator (URL) and wherein a parsed text output of speech recognition module is stored in memory and linked with the respective spoken message.

4. The method of claim 2, wherein substep (e1) is performed.

5. The method of claim 2, wherein substep (e2) is performed.

6. The method of claim 4, wherein the markers are embedded in the text stream and further comprising substep:
   (e3) synchronizing marker identification with message playback speed.

7. The method of claim 1, wherein the markers indicate a degree of importance of the respective word.

8. The method of claim 1, wherein the markers indicate a type of the respective word, with differing markers being associated with differing types of words.

9. Memory comprising processor executable instructions operable, when executed, to perform the steps of claim 1.

10. The method of claim 7, wherein words having different types of markers are provided in different manners.

11. The method of claim 8, wherein words having different types of markers are provided in different manners.

12. A method, comprising:
   (a) receiving, by a message interface, a request to play a message audibly to a subscriber;
   (b) receiving the message, the message being in the form of an audio stream;
   (c) converting, by a speech-to-text engine, the message into a text equivalent thereof;
   (d) identifying, by a parsing engine, selected spoken words in the text equivalent, the parsing engine identifying selected spoken words using a set of grammar rules, the set of grammar rules describing a unique structure of each of a plurality of a street address, a telephone number, an email address, a uniform resource locator, a price, an order number, and an article name;
   (e) embedding, by an expert system, markers, in the text equivalent in proximity to the identified selected spoken words, such that the text equivalent comprises marked and unmarked spoken words;
   (f) providing, by a message retrieval agent, the marked spoken words to the subscriber in a manner different from a manner used to provide unmarked spoken words to the subscriber, wherein at least one of the following substeps is performed:
      (f1) altering an audio playback speed of the marked spoken word to the subscriber, the playback speed of the marked spoken word being different from a playback speed of unmarked spoken word; and
      (f2) audibly playing selectively only one of the marked spoken words and unmarked spoken words to the subscriber, wherein, in either of substeps (f1) and (f2), marker identification in the text equivalent is synchronized with adjustment of voice playback speed; and
   (g) distinguishing, in a display to the subscriber, between marked and unmarked words with a relative position of selected words in a message string being indicated.

13. The method of claim 12, wherein substep (f1) is performed.

14. The method of claim 12, wherein substep (f2) is performed and wherein the other of the marked and unmarked information is not audibly played in temporal proximity to substep (b2).

15. The method of claim 12, wherein the grammar rules describe a unique structure of a street address, a telephone number, an email address, and a Uniform Resource Locator (URL).

16. The method of claim 12, wherein the markers indicate a degree of importance of the respective word.

17. The method of claim 12, wherein the markers indicate a type of the respective word, with differing markers being associated with differing types of words.

18. Memory comprising processor executable instructions operable, when executed, to perform the steps of claim 12.

19. The method of claim 16, wherein words having different types of markers are provided in different manners.

20. The method of claim 17, wherein words having different types of markers are provided in different manners.

21. A messaging system, comprising:
   (a) an interface operable to receive a request to play a message audibly to a subscriber;
   (b) a parsing engine operable to identify selected spoken words using a set of grammar rules, the set of grammar rules describing a unique structure of each of a plurality of a street address, a telephone number, an email address, a uniform resource locator, a price, an order number, and an article name; and
   (c) a message retrieval agent operable to determine whether the message comprises marked spoken information and, when the message comprises marked spoken information, perform at least one of the following suboperations:
      (C1) distinguish, in a display to the subscriber, between the marked and unmarked spoken information with a relative position of the marked spoken information in a message string being indicated; and
      (C2) audibly play selectively only one of the marked spoken information and unmarked spoken information to the subscriber.

22. The messaging system of claim 21, wherein suboperation (C1) is performed and wherein the other of the marked and unmarked information is not displayed simultaneously to the subscriber.

23. The messaging system of claim 21, wherein suboperation (C2) is performed and wherein the other of the marked and unmarked information is not audibly played in temporal proximity to suboperation (C2).

24. The messaging system of claim 21, wherein the set of grammar rules describes a unique structure of a street address, a telephone number, and an email address.

25. The messaging system of claim 21, wherein the markers indicate a degree of importance of the respective word.

26. The messaging system of claim 21, wherein the markers indicate a type of the respective word, with differing markers being associated with differing types of words.

27. The messaging system of claim 25, wherein words having different types of markers are provided in different manners.

28. The messaging system of claim 26, wherein words having different types of markers are provided in different manners.

29. The messaging system of claim 21, wherein the unique structure of a telephone number is identified by one or more of a string of seven digits and a string of eleven digits.

\* \* \* \* \*